Feb. 21, 1967 D. W. McKEE 3,305,116
INDUSTRIAL TRUCK DRIVING AND STEERING ARRANGEMENT
Filed Nov. 4, 1963 2 Sheets-Sheet 1

INVENTOR
DALE W. McKEE
BY J.C. Wiessler
ATTORNEY

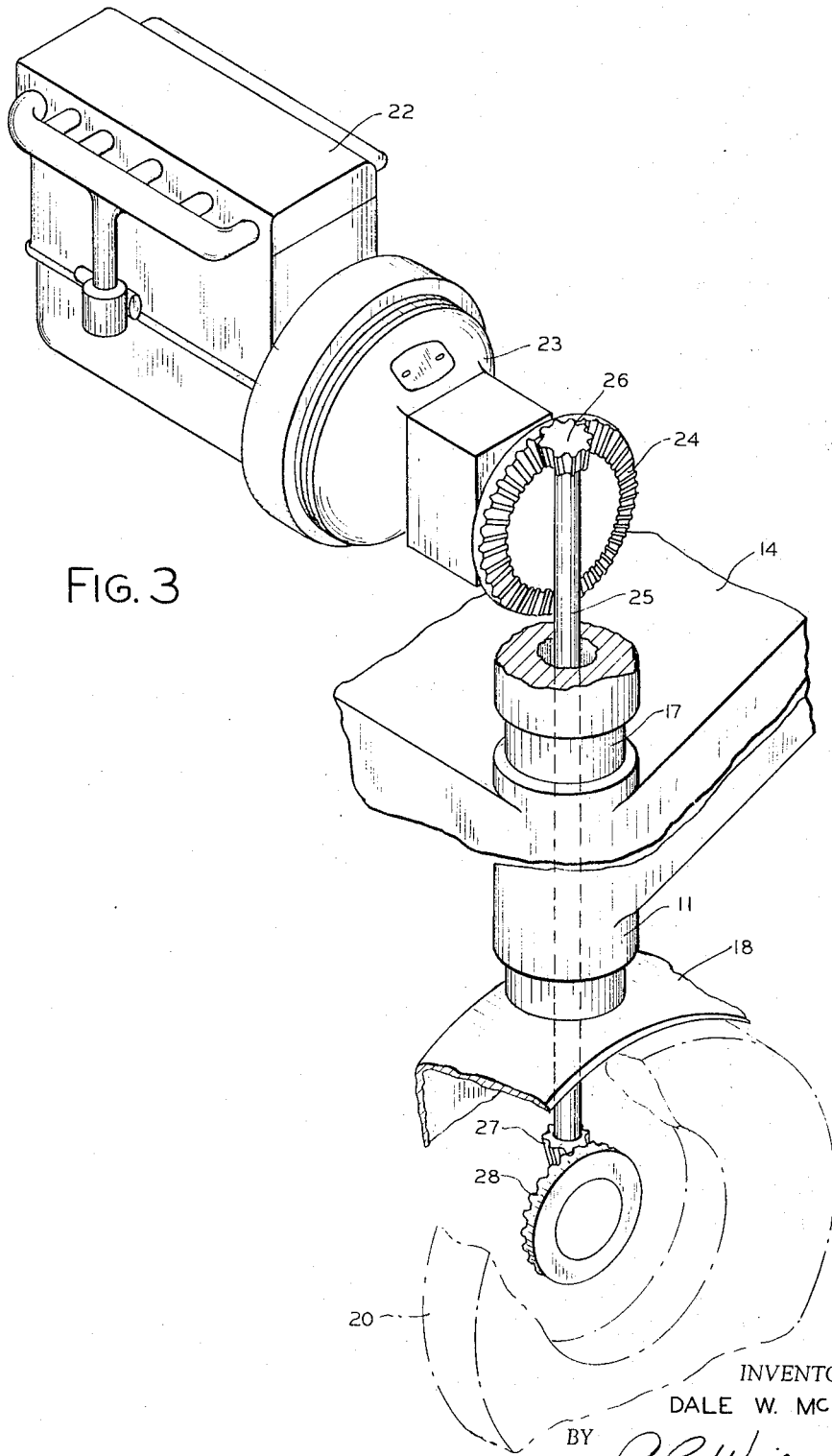

United States Patent Office 3,305,116
Patented Feb. 21, 1967

3,305,116
INDUSTRIAL TRUCK DRIVING AND
STEERING ARRANGEMENT
Dale W. McKee, Battle Creek, Mich., assignor to Clark
Equipment Company, a corporation of Michigan
Filed Nov. 4, 1963, Ser. No. 321,120
1 Claim. (Cl. 214—392)

The present invention relates to industrial trucks and especially to straddle carriers or other such trucks adapted for conveying heavy, bulky, or elongated articles, and more particularly to an improved driving and steering arrangement therefor.

Industrial trucks, and particularly trucks of large capacity adapted for handling and conveying heavy and/or cumbersome loads, such as straddle carriers, often present a problem in steering control. Since they are commonly driven from one end, they tend to yaw and veer from the desired steered course by reason of the mass or weight and size of the truck and the load carried thereby, the undriven end tending to turn or swing off course. It will be appreciated, also, that these large and heavy trucks encounter difficulty in turning because of the necessarily greater turning radius which they require, as well as the steering difficulty already mentioned resulting from applying the driving force at one end of a large and heavy truck, which additionally may be heavily loaded or loaded with cumbersome articles. It is often advantageous and desirable, or even necessary, to maneuver such a truck so as to assume a position parallel to the course it followed in reaching a given point, as in a storage or other unloading area, in order to orient the load in a particular manner or for other reasons. The same difficulty occurs when the truck is to be positioned at an angle to its previous course, if only a small space is available for maneuvering. The movements required of a truck basically not adapted for easy maneuverability by reason of its size and weight are time-consuming and relatively complicated, and become even more so in the case of a relatively small area. The problem is somewhat simplified if the truck steering mechanism allows the wheels to be turned for crab steering, so that the truck may be driven sidewise. The tractive force is then unbalanced, however, being all to one side of the vehicle axis parallel to vehicle direction. The steering difficulty thus remains, in even greater degree.

The present invention is directed to remedying the steering difficulties of such large and heavy industrial trucks, such, for example, as straddle carriers, by providing a driving and steering arrangement which results in balanced tractive forces regardless of the direction or mode of movement of the vehicle, or the direction in which it is turned, and which greatly improves the maneuverability of such trucks by permitting various modes of steering therefor, including crab steering so that the truck may move sidewise, while maintaining the same balanced tractive forces which obtain during its movement in endwise fashion. These advantageous results are obtained by mounting all of the wheels of the truck so as to be steerable, in generally rectangular or quadrangular relation, with two diagonally related wheels independently driven as traction wheels. By employing with this wheel arrangement steering means allowing considerable versatility in the different modes of steering the truck, the maximum facility and flexibility in the driving and steering of the vehicle is obtained.

It is accordingly an object of the invention to provide a drive for an industrial truck which provides balanced tractive forces regardless of the direction and mode of movement of the vehicle, to assure that the vehicle will follow truly the steered course.

Another object is the provision of a drive arrangement particularly for large-capacity industrial trucks in which a traction wheel is disposed at one end and adjacent one side, and a second traction wheel is provided at the other end, and relatively remote from the one side.

It is another object to provide for large-capacity industrial trucks a drive arrangement employing traction wheels in alternating arrangement to apply substantially equal tractive forces adjacent each end and side of a truck and improve its maneuverability regardless of its direction or mode of movement.

It is also an object of the invention to provide large-capacity industrial trucks with traction wheels so related and driven as to effect substantially equal application of tractive forces at opposite ends and sides of the vehicle and to improve the maneuverability of the vehicle.

It is a further object to provide individual drive motors for diagonally related steerable traction wheels of an industrial truck extending horizontally and each rotatable with the associated wheel upon direction turning thereof, oriented on the truck so as to come within the maneuvering envelope of the truck corresponding to such turning.

Other and further objects, advantages and features of the invention will be apparent to those skilled in the art from the following detailed description taken in conjunction with the accompanying drawings, in which:

FIGURE 3 is an enlarged diagrammatic view showing the driving mechanism for one of the traction wheels of the vehicle of FIG. 1.

Figure 1:
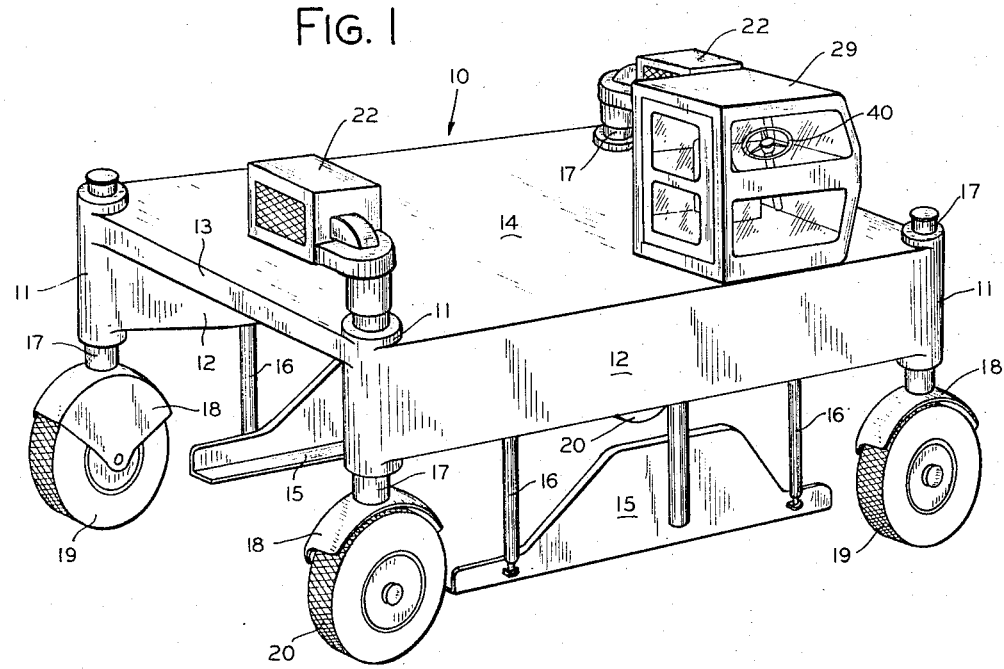
FIGURE 1 is a perspective view of a straddle carrier incorporating the invention.

Referring first to FIG. 1 of the drawings, there is shown an industrial truck, in particular a straddle carrier, generally designated 10, including a rectangular frame having side frame portions provided by cylindrical corner housings 11 disposed in vertical position at the front and rear ends of the carrier, connected by longitudinal side plate members 12. Suitable cross members, concealed in this instance by a rear plate 13 and a top cover plate 14, connect the upper portions of the side frames, including the corner housings, the plates 13 and 14 also serving as connections between the sides of the frame. It will be evident that a bay open at the bottom and ends is defined between the side frames of the carrier. Load supports 15 are movably mounted on the side frames by link means 16 to lift a load, so that the carrier may raise, transport, and deposit large or cumbersome articles. Extending through each of the hollow cylindrical corner posts or housings 11 and journaled therein by any suitable bearings (not shown) is a wheel tube 17 having secured to its lower end a wheel fork 18 mounting the ground-engaging support wheels 19 and 20 of the carrier in known manner. The wheel forks are shown as open at the laterally outer sides of the carrier, for easy inspection and replacement of the wheels.

It will be apparent that all four of the wheels are swivelly mounted so that they may be steered by being turned about a vertical axis, one steering mechanism suitable for this purpose being illustrated in FIG. 2 and described hereinafter. The wheels 19 are disposed at diagonally opposite corners of the carrier, and are not driven, while the wheels 20 are traction wheels, disposed at the other two diagonally opposite corners of the carrier, and each driven by any suitable motor or engine 22 mounted on the upper end of the associated wheel tube 17 to rotate with the tube and wheel in steering movements thereof. Each engine or motor drives its associated traction wheel 20 by any suitable means, one drive connection means being clearly shown in FIG. 3. The engine 22, shown without its casing as an internal combustion engine of common type, has the drive shaft thereof connected through transmission means 23 to a bevel gear 24 rotatable on a horizontal axis. A vertical drive shaft 25 extends centrally through the wheel tube 17, and carries on the upper end thereof a bevel gear 26 meshing with the bevel gear 24, and at its lower end has a bevel gear 27 which engages with a bevel gear 28 connected to the wheel 20, shown in phantom, to drive the same in accordance with operation of the motor 22. While the motors 22 in this instance are shown as extending horizontally from their supports on the wheel tubes, and may swing so as to extend outboard of the carrier, they do not interfere with operation of the carrier. The motors are so oriented on the truck that the areas of movement or envelopes thereof conform at all times to the area of maneuvers, or maneuvering envelope, of the carrier, since swinging of either motor to an outboard position corresponds to steering rotation of the associated traction wheel such that the motor or engine lies between the turning center of the carrier and the arc described by the portion of the carrier furthest from such center. It will be apparent that instead of the gear drive illustrated in FIG. 3, each traction wheel may be driven from its motor 22 by other means, such for example as a chain drive arrangement, if desired. Operation of the motors 22 is controlled from an operator's compartment or cab 29 mounted on the top of the carrier, in such position as to be clear of both engines 22, as shown in FIG. 1. Control of the mechanism (not shown) for operation of the load support links 16 is also provided in the cab 29.

Figure 2:
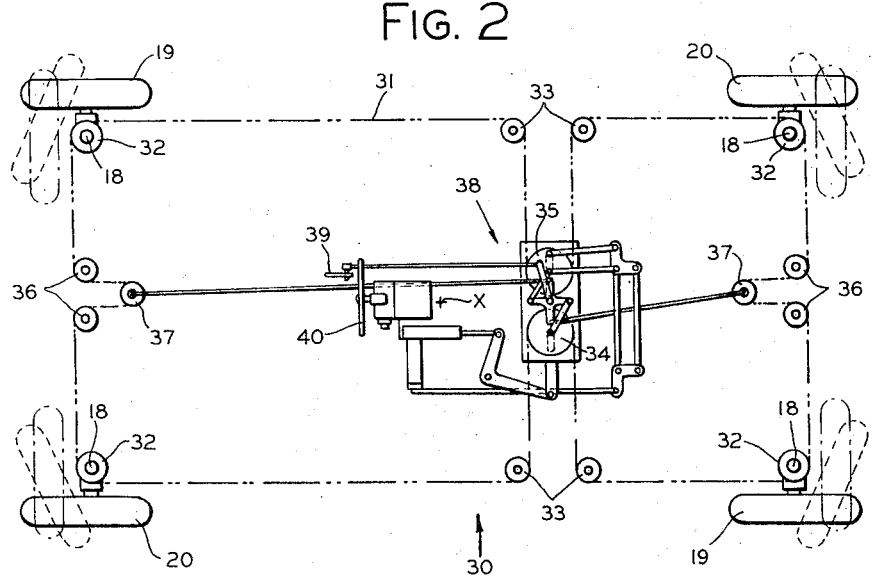
FIGURE 2 is a diagrammatic plan view of a steering mechanism which may be employed on the vehicle shown in FIG. 1.

A steering mechanism for effecting desired steering of the carrier 10, including crab steering thereof, is shown diagrammatically in FIG. 2. The illustrated system is disclosed in detail in the copending application for patent of John C. Christenson and Ronald A. Brudi for "Universal Steering Apparatus," Serial No. 203,334, filed June 18, 1962, (common assignee), now Patent No. 3,198,541, FIG. 2 corresponding substantially to FIG. 20 of said application. Reference is made to that application for a complete and detailed disclosure of the construction and operation of the steering mechanism, generally indicated at 30 in FIG. 2. A brief explanation, sufficing for a general understanding of the steering of the carrier 10 as it bears upon the invention, however, is given herein as a matter of convenience. The mechanism 30 comprises an endless sprocket chain 31 or the like trained about four sprockets 32 each fixed on one of the wheel tubes 17 for the wheels 19 and 20. Idler sprockets 33, two at each side of the vehicle, provide for training of opposed longitudinal runs of the chain 31 laterally inwardly about a pair of control sprockets 34 and 35, rotatably and slidably mounted on the vehicle. Idler sprockets 36 arranged in pairs at the front and rear of the vehicle allow the transverse runs of the chain to be trained longitudinally about the front and rear sprockets 37 each slidable longitudinally of the vehicle. Linkages indicated generally at 38 connect the sprockets 34, 35 and 37 to manual controls including a lever 39 and a steering wheel 40, located in the operator's cab 29. By manipulation of the controls, the wheels 19 and 20 of the carrier may be turned to selected positions for steering of the vehicle in various modes. Thus, the wheels may be turned from their straight-ahead position as shown in full lines in FIG. 2 to various rotated positions, such as the dotted-line positions shown, or the dot-dash line positions at right angles to the longitudnial axis of the vehicle, so that the vehicle after having been driven in a direction parallel to its axis, may be driven sidewise without turning thereof and proceed in a direction at 90° to the preceding direction. It will be understood that this crab or sidewise movement may be at other than right angles to the axis of the vehicle, by turning all of the wheels to parallel positions at more or less than 90° to the vehicle axis. The positioning of the wheels as shown in dotted lines in FIG. 2 results in the turning center falling within the confines or plan outline of the vehicle, centrally of the vertical swivel axes of the wheels, as indicated at X. Thus the vehicle may be rotated about a vertical axis without progressing in any direction, and upon reaching a desired heading be driven along the new course by turning of the wheels to the position necessary for the particular direction. The steering mechanism also permits either the front or rear wheels to be steered without directional turning of the other pair of wheels, or the turning of all four wheels to cooperate in guiding the vehicle along a desired arc, as explained in the aforesaid application Serial No. 203,334.

It will be evident that other steering mechanisms or arrangements than that illustrated in FIG. 2 may be employed, if desired so long as they will provide the desired steering of the vehicle.

The invention is not limited to the use of driving motors or engines individual to the several traction wheels and arranged to swivel with the wheels, since other means for driving the traction wheels independently of each other might of course be provided.

By having the dirigible traction wheels 20 disposed at diagonally opposite corners of the carrier, the tractive forces at opposite sides or ends of the vehicle are substantially balanced, regardless of the direction in which the vehicle is traveling or the position of the wheels relative to the body of the carrier. It will be appreciated that if the traction wheels were not disposed in the alternate arrangement disclosed, and were instead disposed in the conventional way at adjacent wheel locations on the carrier, as for example both at the rear of the carrier, the other end of the vehicle might tend to veer or yaw because of the mass and size of the vehicle and its load. If the vehicle were driven in the crab mode, in a direction transverse of its longitudinal axis, the traction wheels would both be on the same side of the axis of the vehicle paralleling the direction of travel, and it would be extremely difficult at best to hold the carrier to the steered course, since the portion supported by the non-tractive wheels would tend to swing and otherwise move relative to the portion supported by the traction wheels. This obviously would be inefficient and inconvenient, and also dangerous.

With one of the traction wheels disposed adjacent one end and one side of the vehicle, and the other traction wheel disposed adjacent the other end and the other side of the carrier, the traction wheels must necessarily be disposed on opposite sides of the axis of the vehicle corresponding to the direction in which it is traveling, except when such direction-corresponding axis passes through the vertical swivel axes of the corresponding axis of the traction wheels. In the latter case, of course, the tractive forces on the opposite sides of such axis are still balanced. The provision of independently driven traction wheels in the generally diagonal relation as disclosed also has advantages in providing for flexibility and versatility in steering and maneuverability of the vehicle. For example, one of the wheels may be deactivated as a driving wheel while the other is driven, or one may be driven at a slower speed than the other, either in the same or the opposite direction, such operation effecting changes in the turning radius, or effecting turning of the carrier on a nonarcuate curve, to facilitate the turning and positioning of the carrier. In conjunction with a versatile steering arrangement, therefore, the diagonal or alternating arrangement of the traction wheel provides greatly improved maneuverability of otherwise cumbersome vehicles.

The invention is not limited to application to vehicles with just four wheels, since it may be employed in vehicles having more or less than four wheels. Thus, it may be employed on six-wheeled vehicles, as well as on vehicles having three wheels, one at one end and two at the other. In the latter, of course, the single wheel at one end and one of the two wheels at the other end would be traction wheels, the two traction wheels being in a generally diagonal relationship even with the single wheel disposed centrally between the sides of the vehicle. Similarly, in a six-wheeled vehicle, the general diagonal relationship between the traction wheels might be provided by an intermediate wheel on one side of the vehicle and a corner or end wheel at the other side of the vehicle, particularly where the intermediate wheel was disposed relatively close to the longitudinally outer or end wheel on its side of the vehicle. The principle of the invention may also be employed in vehicles having more than six wheels, as, for example, eight wheels, with more than two of the wheels traction wheels, preferably four traction wheels. In such case, two wheels at each side of the vehicle would be traction wheels, the four wheels preferably being arranged in a parallelogram arrangement, although a trapezoidal arrangement might also be employed. Obviously, also, the principle of the invention may be employed on vehicles having higher numbers of wheels, whether odd or even, in which greater numbers of traction wheels may be employed, although it must be understood that the number of traction wheels does not necessarily increase with an increased number of vehicle supporting wheels.

It will be understood that the single embodiment of the invention illustrated herein is exemplary of the inventive concept and that the invention is not limited to such embodiment, since modifications and variations thereof, some of which have been described and suggested hereinabove, may be made without departing from the spirit and scope of the invention as set forth in the appended claims.

I claim:

An industrial vehicle of the load straddling type comprising a frame including an upper portion and depending side portions defining a load bay below said upper portion, means for supporting a load in said bay for transport by the vehicle, four wheels supporting said frame arranged at the corners of a quadrangle, means steerably mounting said wheels on the frame to swivel about vertical axes for guiding the vehicle means for steering the wheels in a plurality of modes, and individual drive means for each of two diagonally related wheels respectively rotatable therewith upon swiveling thereof, said drive means each including a prime mover disposed above said load bay and means connecting the prime mover to the associated wheel in driving relation, each of said prime movers in its entirety projecting radially of the swivel axis of the wheel driven thereby and in a direction inwardly and generally transversely of the vehicle in neutral steering position of the wheels.

References Cited by the Examiner
UNITED STATES PATENTS

| | | | |
|---|---|---|---|
| 1,354,618 | 10/1920 | Lindner | 180—25 |
| 1,745,598 | 2/1930 | Brinton | 180—45 |
| 1,798,412 | 3/1931 | Grab | 214—392 |
| 1,812,958 | 7/1931 | Jennings | 180—26 |
| 3,067,839 | 12/1961 | Gibson | 280—91 X |
| 3,198,541 | 8/1965 | Christensen et al. | 280—91 |

A. HARRY LEVY, *Primary Examiner.*